United States Patent
Zhang et al.

(10) Patent No.: US 11,620,175 B2
(45) Date of Patent: *Apr. 4, 2023

(54) METHOD AND APPARATUS FOR DISCONNECTING LINK BETWEEN PCIE DEVICE AND HOST

(71) Applicant: HUAWEI TECHNOLOGIES CO., LTD., Guangdong (CN)

(72) Inventors: Haopeng Zhang, Chengdu (CN); Pei Wu, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 532 days.

This patent is subject to a terminal disclaimer.

(21) Appl. No.: 16/740,717

(22) Filed: Jan. 13, 2020

(65) Prior Publication Data

US 2020/0151045 A1    May 14, 2020

Related U.S. Application Data

(63) Continuation of application No. 15/819,440, filed on Nov. 21, 2017, now Pat. No. 10,565,043, which is a (Continued)

(30) Foreign Application Priority Data

Sep. 11, 2015    (CN) .......................... 201510580109.1

(51) Int. Cl.
*G06F 13/38*    (2006.01)
*G06F 11/07*    (2006.01)
(Continued)

(52) U.S. Cl.
CPC ...... *G06F 11/0757* (2013.01); *G06F 11/0745* (2013.01); *G06F 13/38* (2013.01);
(Continued)

(58) Field of Classification Search
CPC .. G06F 11/0757; G06F 11/0745; G06F 13/38; G06F 13/4282; G06F 2213/0026
See application file for complete search history.

(56) References Cited

U.S. PATENT DOCUMENTS 7,836,352 B2    11/2010  Das et al.
9,344,219 B2    5/2016   Ran
(Continued)

FOREIGN PATENT DOCUMENTS

CN    101645766    2/2010
CN    102349059    2/2012
(Continued)

OTHER PUBLICATIONS

Budruk et al., "PCI Express System Architecture", Mindshare, Inc., technical edit by Joe Winkles, library of Congress Cataloging-in-publication date, PC System architecture series, Apr. 2008, 222 pages.

(Continued)

*Primary Examiner* — Idriss N Alrobaye
*Assistant Examiner* — Ronald T Modo
(74) *Attorney, Agent, or Firm* — Fish & Richardson P.C.

(57) ABSTRACT

A method, an apparatus and a system for disconnecting a link between a Peripheral Component Interconnect Express (PCIe) device and a host, and pertains to the field of computer technologies. The PCIe device includes an endpoint (EP) device. The method includes: obtaining, by the EP device, an error type of an error in transmitting a transaction layer packet (TLP) between the PCIe device and the host; if the error type is a correctable error type specified in the PCIe protocol, collecting, by the EP device, statistics of a duration for which the error type exists; and discon-
(Continued)

necting, by the EP device, a link between the PCIe device and the host if the statistics of the duration reaches a preset duration.

20 Claims, 10 Drawing Sheets

Related U.S. Application Data continuation of application No. PCT/CN2016/083801, filed on May 28, 2016.

(51) Int. Cl.
  *G06F 13/42* (2006.01)
  *H04L 1/1867* (2023.01)
  *H04L 1/24* (2006.01)
(52) U.S. Cl.
  CPC .. *G06F 13/4282* (2013.01); *G06F 2213/0026* (2013.01); *H04L 1/188* (2013.01); *H04L 1/24* (2013.01)

(56) References Cited

U.S. PATENT DOCUMENTS

| | | | | |
|---|---|---|---|---|
| 2009/0154456 A1* | 6/2009 | Dodson | ................... | H04L 47/39 370/389 |
| 2011/0246833 A1* | 10/2011 | Bockhaus | ........... | H04L 43/0847 714/37 |
| 2012/0030402 A1 | 2/2012 | Masayuki et al. | | |
| 2012/0079312 A1 | 3/2012 | Sridhar et al. | | |
| 2012/0311373 A1 | 12/2012 | Chencinski et al. | | |
| 2013/0060987 A1 | 3/2013 | Bolen et al. | | |
| 2015/0095688 A1* | 4/2015 | Sugumar | ............. | G06F 13/4273 713/500 |
| 2017/0091013 A1 | 3/2017 | Tallam et al. | | |
| 2018/0095817 A1 | 4/2018 | Zhang et al. | | |

FOREIGN PATENT DOCUMENTS

| | | | | |
|---|---|---|---|---|
| CN | 103270497 | | 8/2013 | |
| CN | 103533045 | | 1/2014 | |
| CN | 103563336 | | 2/2014 | |
| CN | 105205021 | | 12/2015 | |
| JP | 2011175555 A | * | 9/2011 | ............. G06F 1/266 |
| JP | 4947722 | | 6/2012 | |
| WO | 2012164417 | | 12/2012 | |

OTHER PUBLICATIONS

Extended European Search Report issued in European Application No. 16843471.0 dated Jun. 27, 2018, 5 pages.
International Search Report and Written Opinion issued in International Application No. PCT/CN2016/083801 dated Jul. 26, 2016, 13 pages.
Office Action issued in Chinese Application No. 201510580109.1 dated Sep. 27, 2017, 10 pages.
PCI Express® Base Specification Revision 3.0, Nov. 10, 2010, 860 pages.

\* cited by examiner

METHOD AND APPARATUS FOR DISCONNECTING LINK BETWEEN PCIE DEVICE AND HOST

CROSS-REFERENCE TO RELATED APPLICATIONS

This application is a continuation of U.S. patent application Ser. No. 15/819,440, filed on Nov. 21, 2017, which is a continuation of International Application No. PCT/CN2016/083801, filed on May 28, 2016. The International Application claims priority to Chinese Patent Application No. 201510580109.1, filed on Sep. 11, 2015. All of the aforementioned patent applications are hereby incorporated by reference in their entireties.

TECHNICAL FIELD

The present disclosure relates to the field of computer technologies, and in particular, to a method and an apparatus for disconnecting a link between a Peripheral Component Interconnect Express (PCIe) device and a host.

BACKGROUND

With popularity of the Peripheral Component Interconnect Express (PCIe) protocol, a host may be connected to multiple input output (IO) devices, and each of the multiple IO devices includes a PCIe device. Therefore, the host is connected to multiple PCIe devices, and exchanges data with another device other than the host using the multiple PCIe devices, to complete a host service.

A PCIe device may encounter an exception during operation. Therefore, when a PCIe device encounters an exception, because a host cannot identify the PCIe device that encounters the exception, the host disconnects from all PCIe devices connected to the host, to prevent a central processing unit (CPU) of the host from being halted.

The prior art has at least the following problem:

A host disconnects from all PCIe devices connected to the host, and consequently, the host cannot exchange data with another device, and a host service is affected.

SUMMARY

To resolve a prior-art problem, the present disclosure provides a method and an apparatus for disconnecting a link between a PCIe device and a host. The technical solutions are as follows:

According to a first aspect, the present disclosure provides a method for disconnecting a link between a Peripheral Component Interconnect Express PCIe device and a host, the PCIe device includes an endpoint EP device, and the method includes:

obtaining, by the EP device, an error type of an error in transmitting a transaction layer packet (TLP) between the PCIe device and the host;

collecting, by the EP device, statistics on duration for which the error type exists when the error type is a correctable error type specified in the PCIe protocol; and disconnecting, by the EP device, a link between the PCIe device and the host when the duration reaches preset duration.

With reference to the first aspect, in a first possible implementation of the first aspect, the obtaining, by the EP device, an error type of an error in transmitting a TLP between the PCIe device and the host includes:

receiving, by the EP device, a TLP sent by the host, and determining whether the TLP is corrupted; and determining, by the EP device, that the error type of the error in transmitting the TLP between the PCIe device and the host is a negative acknowledgement NAK error type when the TLP is corrupted.

With reference to the first aspect, in a second possible implementation of the first aspect, the obtaining, by the EP device, an error type of an error in transmitting a TLP between the PCIe device and the host includes:

receiving, by the EP device, a TLP sent by the host, and determining whether the TLP is a preset TLP; and determining, by the EP device, that the error type of the error in transmitting the TLP between the PCIe device and the host is a transmission error type when the TLP is not the preset TLP.

With reference to the second possible implementation of the first aspect, in a third possible implementation of the first aspect, the determining, by the EP device, whether the TLP is a preset TLP includes:

obtaining, by the EP device, a first sequence number of the TLP, and predicting a third sequence number of the TLP according to a second sequence number of a previous TLP whose receiving time is closest to a current time; and determining, by the EP device, that the TLP is not the preset TLP when the first sequence number is not equal to the third sequence number.

With reference to the second possible implementation of the first aspect, in a fourth possible implementation of the first aspect, the transmission error type includes a retransmission error type and a missed-transmission error type, and the method further includes:

determining, by the EP device, that the error type of the error in transmitting the TLP between the PCIe device and the host is the missed-transmission error type when the TLP is later than the preset TLP; or determining, by the EP device, that the error type of the error in transmitting the TLP between the PCIe device and the host is the retransmission error type when the TLP is earlier than the preset TLP.

With reference to the first aspect, in a fifth possible implementation of the first aspect, the obtaining, by the EP device, an error type of an error in transmitting a TLP between the PCIe device and the host includes:

obtaining, by the EP device, a first credit value required by a TLP to be sent by the host and a current remaining second credit value of the EP device; and determining, by the EP device, that the error type of the error in transmitting the TLP between the PCIe device and the host is a credit value insufficiency error type when the first credit value is greater than the second credit value.

With reference to the fifth possible implementation of the first aspect, in a sixth possible implementation of the first aspect, the obtaining, by the EP device, a first credit value required by a TLP to be sent by the host includes:

obtaining, by the EP device, a packet header type, a packet data type, and a packet data length of the TLP to be sent by the host; and determining, by the EP device according to the packet header type, the packet data type, and the packet data length, the first credit value required by the TLP.

With reference to the first aspect, in a seventh possible implementation of the first aspect, the obtaining, by the EP device, an error type of an error in transmitting a TLP between the PCIe device and the host includes:

detecting, by the EP device, whether the PCIe device encounters an exception; and determining, by the EP device, that the error type of the error in transmitting the TLP between the PCIe device and the host is a PCIe device exception error type when the EP device detects that the PCIe device encounters an exception.

With reference to the first aspect, in an eighth possible implementation of the first aspect, the disconnecting, by the EP device, a link between the PCIe device and the host includes:

setting, by the EP device, a system clock of the PCIe device to be in an unavailable state using a gated clock, where the unavailable state is used to instruct the PCIe device to refuse to process a processing request sent by the host.

With reference to the first aspect, in a ninth possible implementation of the first aspect, the method further includes:

disconnecting, by the EP device, the link between the PCIe device and the host when the error type is an uncorrectable error type specified in the PCIe protocol.

According to a second aspect, the present disclosure provides an apparatus for disconnecting a link between a Peripheral Component Interconnect Express PCIe device and a host, the PCIe device includes an endpoint EP device, and the apparatus includes:

an obtaining module, configured to obtain an error type of an error in transmitting a TLP between the PCIe device and the host:

a statistics collection module, configured to: when the error type is a correctable error type specified in the PCIe protocol, collect statistics on duration for which the error type exists; and a disconnection module, configured to disconnect a link between the PCIe device and the host when the duration reaches preset duration.

With reference to the second aspect, in a first possible implementation of the second aspect, the obtaining module includes:

a first receiving unit, configured to receive a TLP sent by the host;

a first determining unit, configured to determine whether the TLP is corrupted; and a second determining unit, configured to: determine that the error type of the error in transmitting the TLP between the PCIe device and the host is a negative acknowledgement NAK error type when the TLP is corrupted.

With reference to the second aspect, in a second possible implementation of the second aspect, the obtaining module includes:

a second receiving unit, configured to receive a TLP sent by the host;

a third determining unit, configured to determine whether the TLP is a preset TLP; and a fourth determining unit, configured to: determine that the error type of the error in transmitting the TLP between the PCIe device and the host is a transmission error type when the TLP is not the preset TLP.

With reference to the second possible implementation of the second aspect, in a third possible implementation of the second aspect, the third determining unit is configured to: obtain a first sequence number of the TLP, and predict a third sequence number of the TLP according to a second sequence number of a previous TLP whose receiving time is closest to a current time; and determine that the TLP is not the preset TLP when the first sequence number is not equal to the third sequence number.

With reference to the second possible implementation of the second aspect, in a fourth possible implementation of the second aspect, the transmission error type includes a retransmission error type and a missed-transmission error type, and the obtaining module further includes:

a fifth determining unit, configured to: determine that the error type of the error in transmitting the TLP between the PCIe device and the host is the missed-transmission error type when the TLP is later than the preset TLP; and a sixth determining unit, configured to: determine that the error type of the error in transmitting the TLP between the PCIe device and the host is the retransmission error type when the TLP is earlier than the preset TLP.

With reference to the second aspect, in a fifth possible implementation of the second aspect, the obtaining module includes:

an obtaining unit, configured to obtain a first credit value required by a TLP to be sent by the host and a current remaining second credit value of the EP device; and a seventh determining unit, configured to: determine that the error type of the error in transmitting the TLP between the PCIe device and the host is a credit value insufficiency error type when the first credit value is greater than the second credit value.

With reference to the fifth possible implementation of the second aspect, in a sixth possible implementation of the second aspect, the obtaining unit is configured to: obtain a packet header type, a packet data type, and a packet data length of the TLP to be sent by the host; and determine, according to the packet header type, the packet data type, and the packet data length, the first credit value required by the TLP.

With reference to the second aspect, in a seventh possible implementation of the second aspect, the obtaining module includes:

a detection unit, configured to detect whether the PCIe device encounters an exception; and an eighth determining unit, configured to: determine that the error type of the error in transmitting the TLP between the PCIe device and the host is a PCIe device exception error type when the detection unit detects that the PCIe device encounters an exception.

With reference to the second aspect, in an eighth possible implementation of the second aspect, the disconnection module is configured to set a system clock of the PCIe device to be in an unavailable state using a gated clock, where the unavailable state is used to instruct the PCIe device to refuse to process a processing request sent by the host.

With reference to the second aspect, in a ninth possible implementation of the second aspect, the disconnection module is further configured to disconnect the link between the PCIe device and the host when the error type is an uncorrectable error type specified in the PCIe protocol.

According to a third aspect, the present disclosure provides a Peripheral Component Interconnect Express PCIe device. The PCIe device includes an endpoint EP device, the EP device includes a memory and a processor, and the memory is configured to store data obtained by the processor;

the processor is configured to obtain an error type of an error in transmitting a TLP between the PCIe device and a host:

the processor is further configured to: collect statistics on duration for which the error type exists when the error type is a correctable error type specified in the PCIe protocol; and the processor is further configured to disconnect a link between the PCIe device and the host when the duration reaches preset duration.

With reference to the third aspect, in a first possible implementation of the third aspect, the processor is further configured to: receive a TLP sent by the host, and determine whether the TLP is corrupted; and the processor is further configured to: when the TLP is corrupted, determine that the error type of the error in transmitting the TLP between the PCIe device and the host is a negative acknowledgement NAK error type.

With reference to the third aspect, in a second possible implementation of the third aspect, the processor is further configured to: receive a TLP sent by the host, and determine whether the TLP is a preset TLP; and the processor is further configured to: determine that the error type of the error in transmitting the TLP between the PCIe device and the host is a transmission error type when the TLP is not the preset TLP.

With reference to the second possible implementation of the third aspect, in a third possible implementation of the third aspect, the processor is further configured to: obtain a first sequence number of the TLP, and predict a third sequence number of the TLP according to a second sequence number of a previous TLP whose receiving time is closest to a current time; and determine that the TLP is not the preset TLP when the first sequence number is not equal to the third sequence number.

With reference to the second possible implementation of the third aspect, in a fourth possible implementation of the third aspect, the transmission error type includes a retransmission error type and a missed-transmission error type; and the processor is further configured to: determine that the error type of the error in transmitting the TLP between the PCIe device and the host is the missed-transmission error type when the TLP is later than the preset TLP; or the processor is further configured to: determine that the error type of the error in transmitting the TLP between the PCIe device and the host is the retransmission error type when the TLP is earlier than the preset TLP.

With reference to the third aspect, in a fifth possible implementation of the third aspect, the processor is further configured to obtain a first credit value required by a TLP to be sent by the host and a current remaining second credit value of the EP device; and the processor is further configured to: determine that the error type of the error in transmitting the TLP between the PCIe device and the host is a credit value insufficiency error type when the first credit value is greater than the second credit value.

With reference to the fifth possible implementation of the third aspect, in a sixth possible implementation of the third aspect, the processor is further configured to: obtain a packet header type, a packet data type, and a packet data length of the TLP to be sent by the host; and determine, according to the packet header type, the packet data type, and the packet data length, the first credit value required by the TLP.

With reference to the third aspect, in a seventh possible implementation of the third aspect, the processor is further configured to detect whether the PCIe device encounters an exception; and the processor is further configured to: determine that the error type of the error in transmitting the TLP between the PCIe device and the host is a PCIe device exception error type when the processor detects that the PCIe device encounters an exception.

With reference to the third aspect, in an eighth possible implementation of the third aspect, the processor is further configured to set a system clock of the PCIe device to be in an unavailable state using a gated clock, where the unavailable state is used to instruct the PCIe device to refuse to process a processing request sent by the host.

With reference to the third aspect, in a ninth possible implementation of the third aspect, the processor is further configured to disconnect the link between the PCIe device and the host when the error type is an uncorrectable error type specified in the PCIe protocol.

In the embodiments of the present disclosure, the EP device obtains the error type of the error in transmitting the TLP between the PCIe device and the host; if the error type is the correctable error type specified in the PCIe protocol, the EP device collects the statistics on the duration for which the error type exists; and if the duration reaches the preset duration, the EP device disconnects the link between the PCIe device and the host. In this way, the EP device detects the error type of the error in transmitting the TLP, determines whether the link between the PCIe device and the host encounters an exception, and disconnects the link when detecting that the link encounters an exception. Therefore, impact on a host service can be reduced without a need to disconnect links between the host and all PCIe devices.

BRIEF DESCRIPTION OF DRAWINGS

FIG. 1-2 is a flowchart of a method for disconnecting a link between a PCIe device and a host according to an embodiment of the present disclosure;

FIG. 2-1 is a flowchart of a method for disconnecting a link between a PCIe device and a host according to an embodiment of the present disclosure;

FIG. 2-2 is a hardware diagram of detecting a NAK error type according to an embodiment of the present disclosure;

FIG. 2-3 is a hardware diagram of detecting a transmission error type according to an embodiment of the present disclosure;

FIG. 2-4 is a hardware diagram of detecting a credit value insufficiency error type according to an embodiment of the present disclosure;

FIG. 3-1 is a schematic structural diagram of an apparatus for disconnecting a link between a PCIe device and a host according to an embodiment of the present disclosure:

FIG. 3-2 is a schematic structural diagram of an obtaining module according to an embodiment of the present disclosure;

FIG. 3-3 is a schematic structural diagram of another obtaining module according to an embodiment of the present disclosure;

FIG. 3-4 is a schematic structural diagram of another obtaining module according to an embodiment of the present disclosure;

FIG. 3-5 is a schematic structural diagram of another obtaining module according to an embodiment of the present disclosure;

FIG. 3-6 is a schematic structural diagram of another obtaining module according to an embodiment of the present disclosure; and FIG. 4 is a schematic structural diagram of a PCIe device according to an embodiment of the present disclosure.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
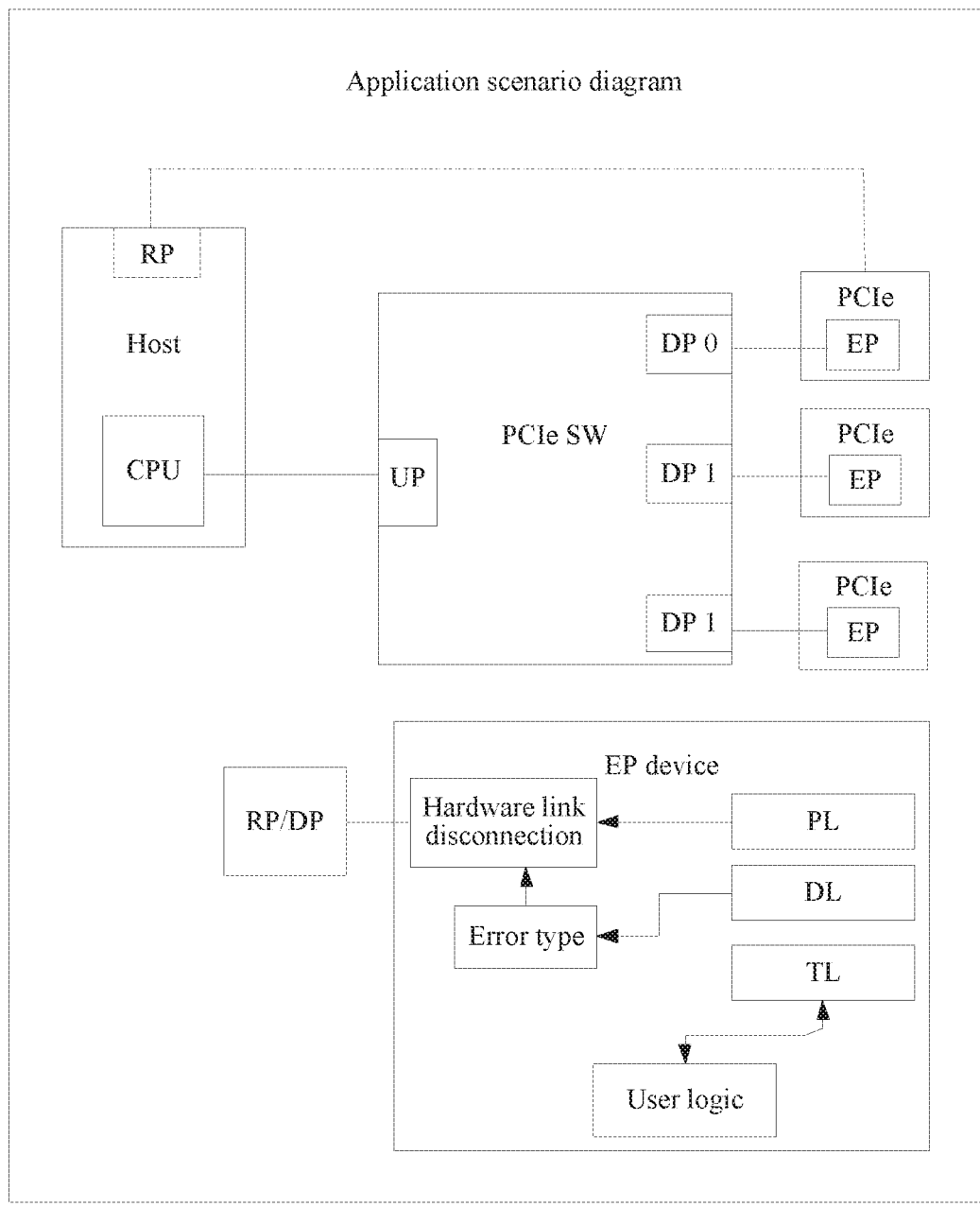
FIG. 1-1 is an application scenario diagram of disconnecting a link between a PCIe device and a host according to an embodiment of the present disclosure.

An embodiment of the present disclosure provides an application scenario of a method for disconnecting a link between a PCIe device and a host. Referring to FIG. 1-1, when a host is connected only to one IO device, the host is directly connected to the IO device using an RP port; or when a host is connected to multiple IO devices, the host is connected to the multiple IO devices using a PCIe switch (SW).

The IO device includes a PCIe device, and the PCIe device includes an endpoint (EP) device. The PCIe SW includes one upstream port (UP) and multiple downstream ports (DP). The PCIe SW is connected to a CPU of the host using the UP, and is connected to the EP device in the PCIe device in the IO device using a DP.

The EP device includes a physical layer (PL), a data link (DL), and a transaction layer (TL). The TL is used to interact with a user, the DL is used to exchange data with the host, and the PL is used to interact with the PCIe device. When it is detected that the DL or the PL encounters an exception, a link between the PCIe device and the host may be disconnected.

Figures 1, 2:
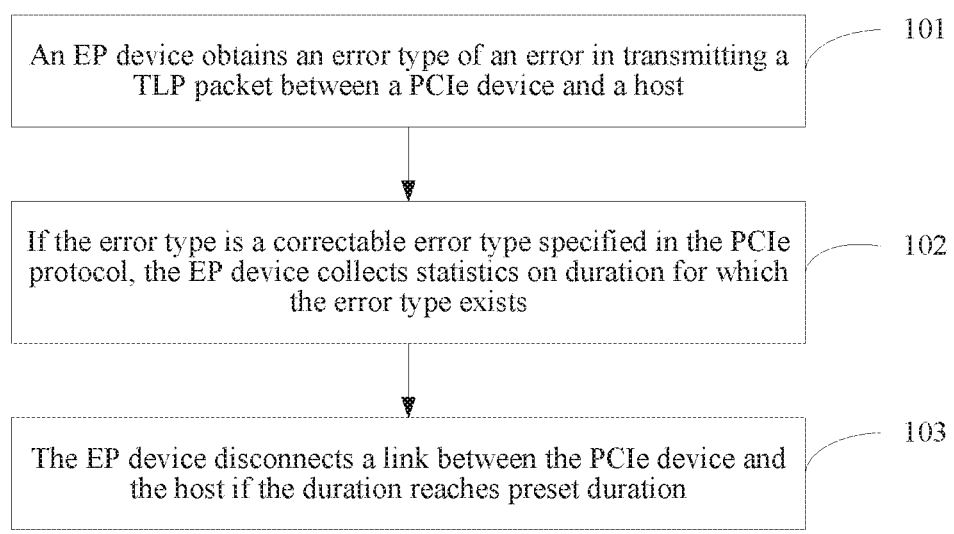

An embodiment of the present disclosure provides a method for disconnecting a link between a PCIe device and a host. The PCIe device includes an EP device, and the method may be performed by the EP device. Referring to FIG. 1-2, the method includes the following steps:

Step 101: The EP device obtains an error type of an error in transmitting a TLP between the PCIe device and the host.

Step 102: If the error type is a correctable error type specified in the PCIe protocol, the EP device collects statistics on duration for which the error type exists.

Step 103: The EP device disconnects a link between the PCIe device and the host if the duration reaches preset duration.

In this embodiment of the present disclosure, the EP device obtains the error type of the error in transmitting the TLP between the PCIe device and the host; if the error type is the correctable error type specified in the PCIe protocol, the EP device collects the statistics on the duration for which the error type exists; and if the duration reaches the preset duration, the EP device disconnects the link between the PCIe device and the host. In this way, the EP device detects the error type of the error in transmitting the TLP, determines whether the link between the PCIe device and the host encounters an exception, and disconnects the link when detecting that the link encounters an exception. Therefore, impact on a host service can be reduced without a need to disconnect links between the host and all PCIe devices.

An embodiment of the present disclosure provides a method for disconnecting a link between a PCIe device and a host. The PCIe device includes an EP device, and the method may be performed by the EP device. Referring to FIG. 2-1, the method includes the following steps:

Step 201: The EP device obtains an error type of an error in transmitting a TLP between the PCIe device and the host.

When the host exchanges a service with the PCIe device, the host sends a resource request to the EP device included in the PCIe device. The resource request carries a packet header type, a packet data type, and a packet data length of a TLP. The EP device receives the resource request sent by the host, calculates, according to the resource request, a credit value required by the TLP, and sends, to the host, the credit value required by the TLP. The host receives the credit value sent by the EP device, and sends the TLP to the EP device using the credit value.

In this step, the error in transmitting the TLP between the PCIe device and the host may occur due to an exception of a link between the PCIe device and the host, credit value insufficiency, or an exception of the EP device. Therefore, this step may be implemented in the following first implementation, second implementation, third implementation, or fourth implementation. In the first implementation, this step may be:

the EP device receives a TLP sent by the host, and determines whether the TLP is corrupted, and if the TLP is corrupted, the EP device determines that the error type of the error in transmitting the TLP between the PCIe device and the host is a negative acknowledgement (NAK) error type.

If the TLP is corrupted during transmission, the TLP carries a corruption identifier. Therefore, the EP device determines whether the TLP carries the corruption identifier; and if the TLP carries the corruption identifier, determines that the TLP is corrupted; or if the TLP does not carry the corruption identifier, determines that the TLP is not corrupted.

Further, if the EP device determines that the TLP is not corrupted, the EP device sends an acknowledgement (ACK) to the host. The host receives the ACK sent by the EP device, and determines, according to the ACK, that the EP device correctly receives the TLP. In this case, the host sends a next TLP to the EP device.

Further, if the EP device determines that the TLP is corrupted, the EP device sends a NAK to the host. The host receives the NAK sent by the EP device, and determines, according to the NAK, that the EP device does not correctly receive the TLP. In this case, the host resends the TLP to the EP device until the host receives an ACK returned by the EP device.

In the second implementation, this step may be implemented using the following steps (1) and (2):

(1). The EP device receives a TLP sent by the host, and determines whether the TLP is a preset TLP.

To determine whether the host resends a TLP to the EP device or misses sending a TLP to the EP device, a TLP sent by the host to the EP device carries a sequence number of the TLP, and a difference between sequence numbers of two adjacent TLPs is 1. Therefore, the EP device may determine the preset TLP according to a sequence number of a previous TLP whose receiving time is closest to a current time. The preset TLP is a TLP that currently needs to be sent to the EP device by the host.

This step may be implemented using the following steps (1-1) and (1-2):

(1-1). The EP device obtains a first sequence number of the TLP, and predicts a third sequence number of the TLP according to a second sequence number of a previous TLP whose receiving time is closest to a current time.

The EP device obtains a sequence number carried in the TLP. For ease of distinguishing, the sequence number carried in the TLP is referred to as the first sequence number. The first sequence number is stored in a sequence number list, so as to subsequently obtain the first sequence number.

The sequence number list stores a sequence number of a TLP that has been received by the EP device, such that the EP device obtains, from the sequence number list, a sequence number of the previous TLP whose receiving time is closest to the current time. For ease of distinguishing, the sequence number of the previous TLP is referred to as the second sequence number. The EP device adds 1 to the second sequence number to obtain a predicted sequence number of the TLP. For ease of distinguishing, the predicted sequence number of the TLP is referred to as the third sequence number.

(1-2). If the first sequence number is not equal to the third sequence number, the EP device determines that the TLP is not the preset TLP.

The EP device determines whether the first sequence number is equal to the third sequence number. If the first sequence number is equal to the third sequence number, the EP device determines that the TLP is the preset TLP. If the first sequence number is not equal to the third sequence number, the EP device determines that the TLP is not the preset TLP.

Further, if the TLP is the preset TLP, step 201 is performed. If the TLP is not the preset TLP, step (2) is performed.

(2). If the TLP is not the preset TLP, the EP device determines that the error type of the error in transmitting the TLP between the PCIe device and the host is a transmission error type.

Further, the EP device may determine, according to the first sequence number and the third sequence number, whether the TLP is later than the preset TLP or the TLP is earlier than the preset TLP. Because the host generates a sequence number using a 12-bit unsigned number, and the host starts counting from 0 again after the sequence number is counted to 4095, a value of a sequence number of a TLP does not indicate whether the TLP is earlier or later. For example, if the sequence number of the TLP is 4095, and a sequence number of the preset TLP is 0, although 4095 is greater than 0, the TLP is earlier than the preset TLP. Therefore, that the EP device determines, according to the first sequence number and the third sequence number, whether the TLP is later than the preset TLP or the TLP is earlier than the preset TLP may be implemented using the following process:

the EP device obtains a bit quantity for generating a sequence number by the host; calculates a sequence number difference between the first sequence number and the third sequence number; calculates a first value according to the bit quantity; calculates a remainder of the sequence number difference and the first value; and if the remainder is greater than or equal to a second value, determines that the TLP is earlier than the preset TLP; or if the remainder is less than a second value, determines that the TLP is later than the preset TLP. The first value is equal to 2 raised to the power of the bit quantity, and the second value is obtained by dividing the first value by 2.

For example, if the bit quantity is 12, the first value is 4096, the second value is 2048, the first sequence number is A_Seq, and the second sequence number is B_Seq. If (A_Seq-B_Seq)%4096>=2048, the TLP is later than the preset TLP. If (A_Seq-B_Seq)%4096<2048, the TLP is earlier than the preset TLP.

Further, if the TLP is later than the preset TLP, the EP device determines that the host misses a TLP or some TLPs. If the TLP is earlier than the preset TLP, the EP device determines that the host resends the TLP to the EP device. Therefore, the transmission error type includes a retransmission error type and a missed-transmission error type. If the TLP is later than the preset TLP, the EP device determines that the error type of the error in transmitting the TLP between the PCIe device and the host is the missed-transmission error type. If the TLP is earlier than the preset TLP, the EP device determines that the error type of the error in transmitting the TLP between the PCIe device and the host is the retransmission error type.

In the third implementation, this step may be implemented using the following steps (A) and (B):

(A). The EP device obtains a first credit value required by a TLP to be sent by the host and a current remaining second credit value of the EP device.

When the host exchanges a service with the PCIe device, the host sends a resource request to the EP device included in the PCIe device. The resource request carries a packet header type, a packet data type, and a packet data length of a TLP. The EP device receives the resource request sent by the host, and calculates, according to the packet header type, the packet data type, and the packet data length, a credit value required by the TLP. For ease of distinguishing, the credit value required by the TLP is referred to as the first credit value.

The EP device stores a correspondence between a packet header type and a credit value, and stores a correspondence between a packet data type, a packet data length, and a credit value. In this case, the step in which the EP device calculates, according to the packet header type, the packet data type, and the packet data length, the first credit value required by the TLP may be:

the EP device obtains, from the correspondence between a packet header type and a credit value according to the packet header type, a third credit value required by a packet header of the TLP; obtains, from the correspondence between a packet data type, a packet data length, and a credit value according to the packet data type and the packet data length, a fourth credit value required by packet data of the TLP; and calculates a sum of the third credit value and the fourth credit value to obtain the first credit value required by the TLP.

The packet header type may be a posted header (PH) or an non-posted header (NPH). In addition, for the PH and the NPH, only one credit value is consumed by a packet header of each TLP. The packet data type includes posted data (PD) and non-posted data (NPD). In addition, for the NPD, only one credit value is consumed by packet data of each TLP, and for the PD, the EP device determines, according to a packet data length, a quantity of credit values required by packet data. Because the host can initiate only a common readwrite operation, it may be specified in this embodiment of the present disclosure that one credit value is consumed by packet data of a PD type of each TLP.

The step in which the EP device obtains the current remaining second credit value may be:

the EP device sets a register, to record a consumed credit value of the EP device, and calculates a current remaining credit value according to a total credit value and the consumed credit value of the EP device. For ease of distinguishing, the current remaining credit value is referred to as the second credit value.

(B). If the first credit value is greater than the second credit value, the EP device determines that the error type of the error in transmitting the TLP between the PCIe device and the host is a credit value insufficiency error type.

Further, if the first credit value is not greater than the second credit value, the EP device sends the first credit value to the host. The host receives the first credit value sent by the EP device, and sends the TLP to the PCIe device using the first credit value.

In the fourth implementation, the step may be:

the EP device detects whether the PCIe device encounters an exception; and if the EP device detects that the PCIe device encounters an exception, the EP device determines that the error type of the error in transmitting the TLP between the PCIe device and the host is a PCIe device exception error type.

Step 202: The EP device determines whether the error type is a correctable error type specified in the PCIe protocol; and performs step 203 if the error type is a correctable error type; or performs step 205 if the error type is an uncorrectable error type.

The EP device stores a library of correctable error types specified in the PCIe protocol. The library of correctable error types includes the negative acknowledgement NAK error type, the missed-transmission error type, the retransmission error type, the credit value insufficiency error type, and the PCIe device exception error type.

The EP device determines whether the error type exists in the library of correctable error types. If the error type exists in the library of correctable error types, the EP device determines that the error type is a correctable error type. If the error type does not exist in the library of correctable error types, the EP device determines that the error type is an uncorrectable error type.

Step 203: If the error type is the correctable error type, the EP device collects statistics on duration for which the error type exists.

If the error type is the correctable error type, it is specified in the PCIe protocol that the error of error type can be corrected without a need to disconnect the link between the PCIe device and the host. However, if the EP device always fails to correct the error of the error type, the error still brings a CPU of the host to a halt. Therefore, in this embodiment of the present disclosure, the statistics on the duration for which the error type exists is collected, and it is determined, according to the duration, whether to disconnect the link between the PCIe device and the host.

When the error type exists, the EP device enables a timer to start timing. When the error of the error type is corrected, the EP device collects the statistics on the duration for which the error type exists, and resets the timer to 0.

For example, when the error type is the NAK timeout error type, the EP device sets a status of a NAK_SCHEDULED bit to a valid state, and records, using the timer, a time in which the status of the NAK_SCHEDULED bit is a valid state. When the error of the NAK timeout error type is corrected, the EP device sets the status of the NAK_SCHEDULED bit to an invalid state, stops the timer, obtains the duration recorded by the timer, and resets the timer to 0.

For another example, when the error type is the transmission error type, the EP device enables the timer to start timing. When the error of the transmission error type is corrected, the EP device stops the timer, obtains the duration recorded by the timer, and resets the timer to 0.

For another example, when the error type is the credit value insufficiency error type, the EP device enables the timer to start timing. When the error of the credit value insufficiency error type is corrected, the EP device stops the timer, obtains the duration recorded by the timer, and resets the timer to 0.

Step 204: The EP device determines whether the duration reaches preset duration; and performs step 205 if the duration reaches the preset duration, or performs step 201 if the duration does not reach the preset duration.

The preset duration may be set and changed according to the error type. That is, a correspondence between an error type and preset duration is stored in this embodiment of the present disclosure. The EP device obtains, from the correspondence between an error type and preset duration according to the error type, the preset duration corresponding to the error type. Therefore, different error types are corresponding to different preset duration, so as to effectively prevent the CPU of the host from being halted.

For example, the correspondence between an error type and preset duration is shown in the following Table 1:

TABLE 1

| Error type | Preset duration |
|---|---|
| NAK error type | 10 s |
| Retransmission error type | 20 s |
| Missed-transmission error type | 15 s |
| Credit value insufficiency error type | 8 s |
| PCIe device exception error type | 5 s |
| . . . | . . . |

For example, when the error type is the NAK timeout error type, the EP device determines that the error occurs because a downlink between the PCIe device and the host encounters an exception. The EP device uses NAK_SCHEDULED (a negative acknowledgement status bit) as a reset signal. When NAK_SCHEDULED is valid, the EP device enables the timer to start timing. When NAK_SCHEDULED is invalid, the EP device stops the timer, and the timer is immediately reset to 0 and remains to be 0. When the duration obtained by the timer reaches the preset duration, the EP device determines that the link between the PCIe device and the host needs to be disconnected. In this case, a hardware link disconnection enabling signal is output, and step 205 is performed. A hardware circuit in the EP device is shown in FIG. 2-2.

Figures 1, 2:
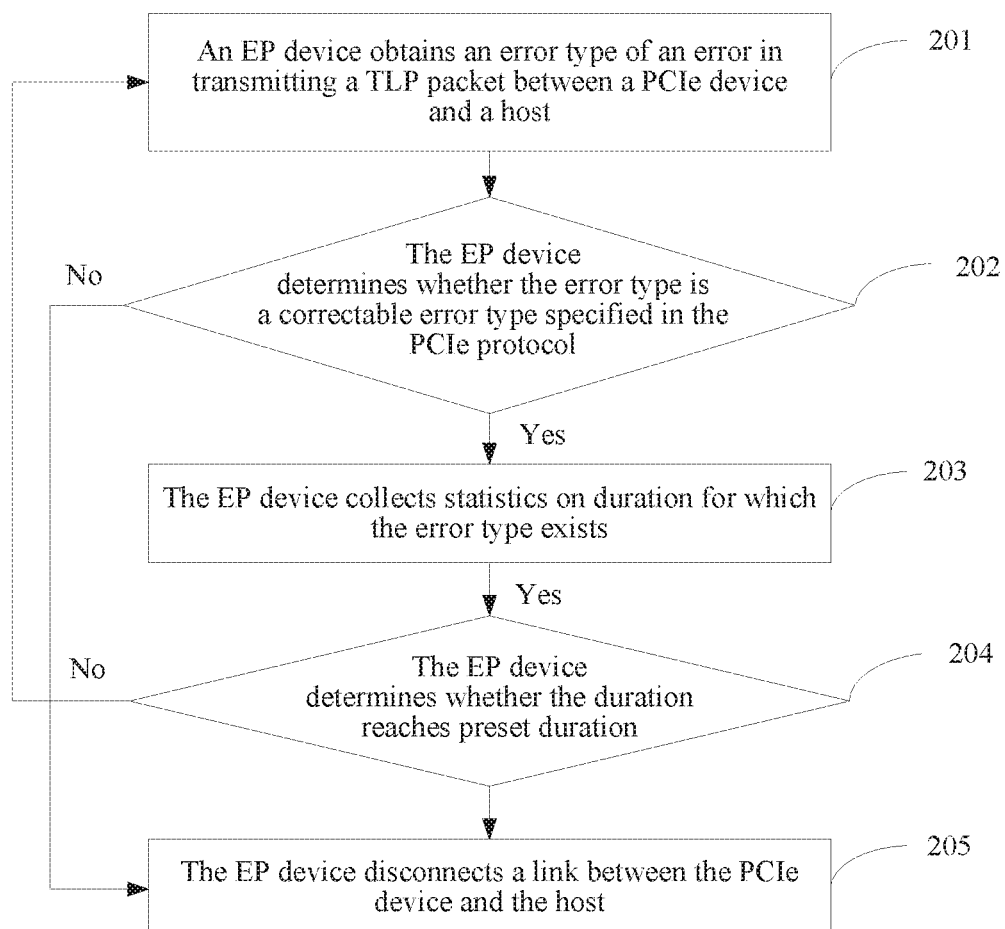
Figure 2:
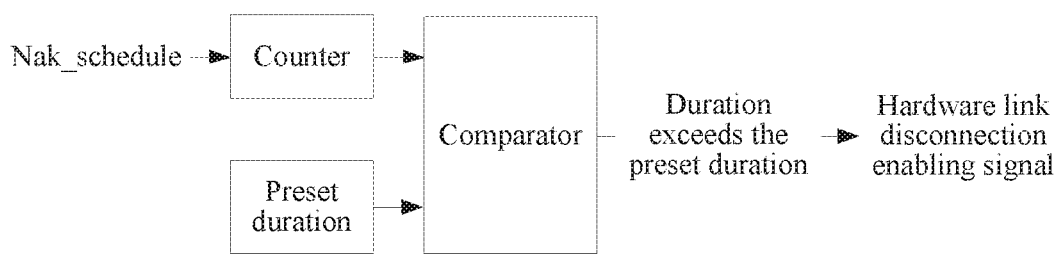
Figures 2, 3:
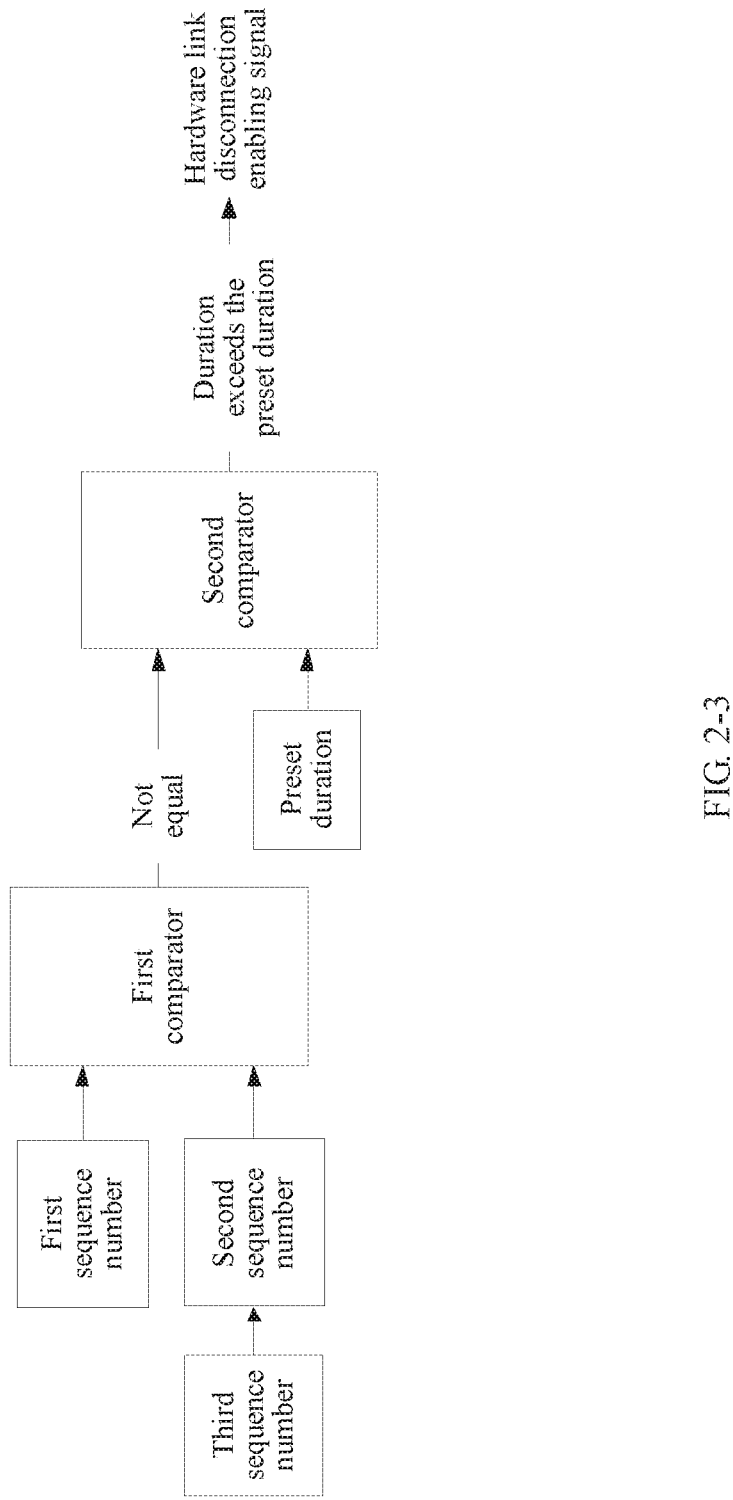

For another example, when the error type is the missed-transmission error type, the EP device determines that the error occurs due to a TLP loss caused by an exception of a downlink between the PCIe device and the host. In this case, the EP device sends a NAK to the host. If the downlink is always in a packet loss state, the downlink is extremely unreliable. Therefore, to prevent the CPU of the host from being halted, when the duration for which the missed-transmission error type exists reaches the preset duration, the EP device needs to disconnect the link between the PCIe device and the host. When the error type is the retransmission error type, the EP device determines that the host retransmits the TLP. When the duration for which the retransmission error type exists reaches the preset duration, the EP device needs to disconnect the link between the PCIe device and the host. In this case, a hardware link disconnection enabling signal is output, and step 205 is performed. A hardware circuit in the EP device is shown in FIG. 2-3.

Figures 2, 3, 4:
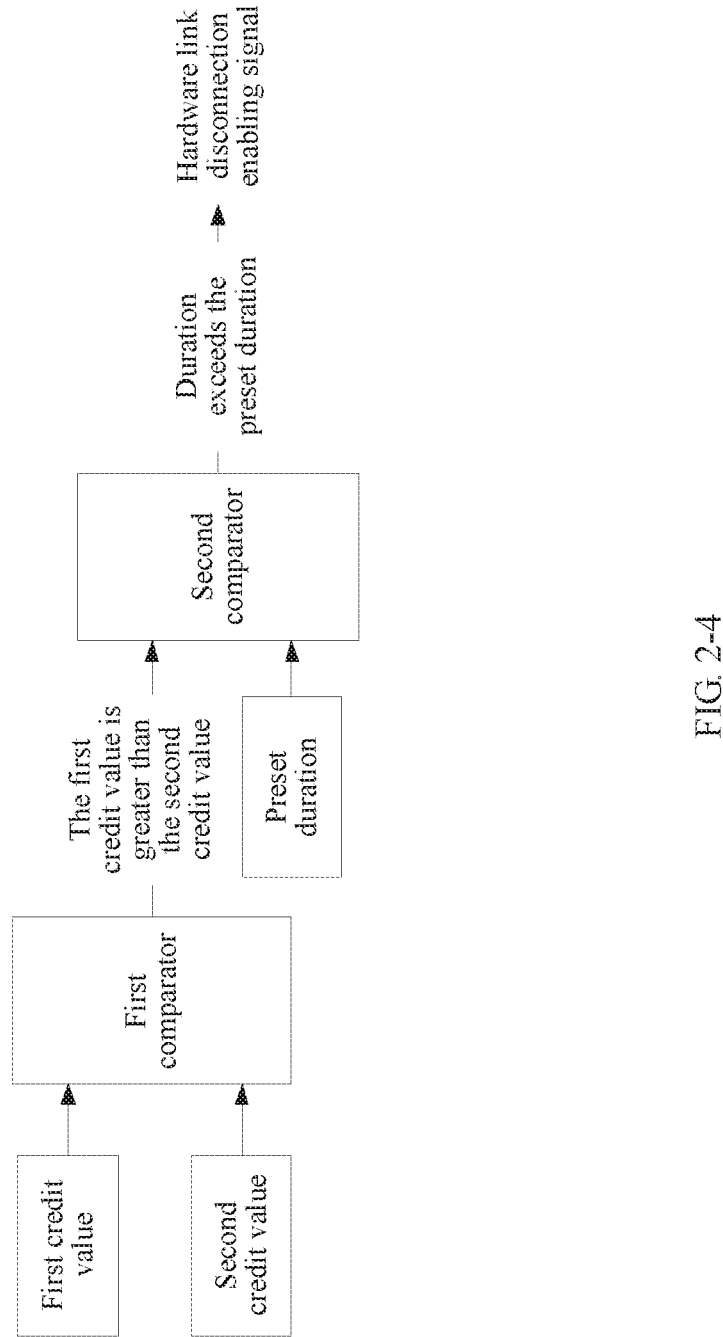

For another example, when the error type is the credit value insufficiency error type, the host cannot send a TLP to the EP device. If the CPU still delivers a large quantity of read/write operations, a buffer of the host is full, and backpressure is put on the CPU side. Consequently, a CPU instruction expires, and the CPU is halted. Therefore, when the duration for which the credit value insufficiency error type exists reaches the preset duration, the EP device needs to disconnect the link between the PCIe device and the host. In this case, a hardware link disconnection enabling signal is output, and step 205 is performed. A hardware circuit in the EP device is shown in FIG. 2-4.

Step 205: The EP device disconnects a link between the PCIe device and the host.

When determining that the link between the PCIe device and the host needs to be disconnected, the EP device sets hardware link disconnection enabling signal link_down=1.

When detecting hardware link disconnection enabling signal link_down=1, the EP device sets a system clock of the PCIe device to be in an unavailable state using a gated clock.

When the PCIe device detects that the system clock is in an unavailable state, the PCIe device refuses to process a processing request sent by the host, so as to disconnect the link between the PCIe device and the host.

When the host cannot obtain a response from the PCIe device, a status of an Link Training and Status State Machine (LTSSM) of the host jumps to a disabled status bit because of a loss of bit lock or symbol lock, and the link between the host and the PCIe device is disconnected. When sensing the disabled status bit, the host clears buffer content related to the PCIe device, and completes isolation from the abnormal PCIe device.

In this embodiment of the present disclosure, the EP device obtains the error type of the error in transmitting the TLP between the PCIe device and the host; if the error type is the correctable error type specified in the PCIe protocol, the EP device collects the statistics on the duration for which the error type exists; and if the duration reaches the preset duration, the EP device disconnects the link between the PCIe device and the host. In this way, the EP device detects the error type of the error in transmitting the TLP determines whether the link between the PCIe device and the host encounters an exception, and disconnects the link when detecting that the link encounters an exception. Therefore, impact on a host service can be reduced without a need to disconnect links between the host and all PCIe devices.

An embodiment of the present disclosure provides an apparatus for disconnecting a link between a Peripheral Component Interconnect Express PCIe device and a host. The PCIe device includes an endpoint EP device, configured to perform the method for disconnecting a link between a PCIe device and a host. Referring to FIG. 3-1, the apparatus includes:

an obtaining module 301, configured to obtain an error type of an error in transmitting a TLP between the PCIe device and the host;

a statistics collection module 302, configured to: if the error type is a correctable error type specified in the PCIe protocol, collect statistics on duration for which the error type exists; and a disconnection module 303, configured to disconnect a link between the PCIe device and the host if the duration reaches preset duration.

Further, referring to FIG. 3-2, the obtaining module 301 includes:

a first receiving unit 3011, configured to receive a TLP sent by the host;

a first determining unit 3012, configured to determine whether the TLP is corrupted; and a second determining unit 3013, configured to: if the TLP is corrupted, determine that the error type of the error in transmitting the TLP between the PCIe device and the host is a negative acknowledgement NAK error type.

Further, referring to FIG. 3-3, the obtaining module 301 includes:

a second receiving unit 3014, configured to receive a TLP sent by the host;

a third determining unit 3015, configured to determine whether the TLP is a preset TLP; and a fourth determining unit 3016, configured to: if the TLP is not the preset TLP, determine that the error type of the error in transmitting the TLP between the PCIe device and the host is a transmission error type.

Further, the third determining unit 3015 is configured to: obtain a first sequence number of the TLP, and predict a third sequence number of the TLP according to a second sequence number of a previous TLP whose receiving time is closest to a current time; and if the first sequence number is not equal to the third sequence number, determine that the TLP is not the preset TLP.

Further, the transmission error type includes a retransmission error type and a missed-transmission error type. Referring to FIG. 3-4, the obtaining module 301 further includes:

a fifth determining unit 3017, configured to: if the TLP is later than the preset TLP, determine that the error type of the error in transmitting the TLP between the PCIe device and the host is the missed-transmission error type; and a sixth determining unit 3018, configured to: if the TLP is earlier than the preset TLP, determine that the error type of the error in transmitting the TLP between the PCIe device and the host is the retransmission error type.

Figures 1, 3:
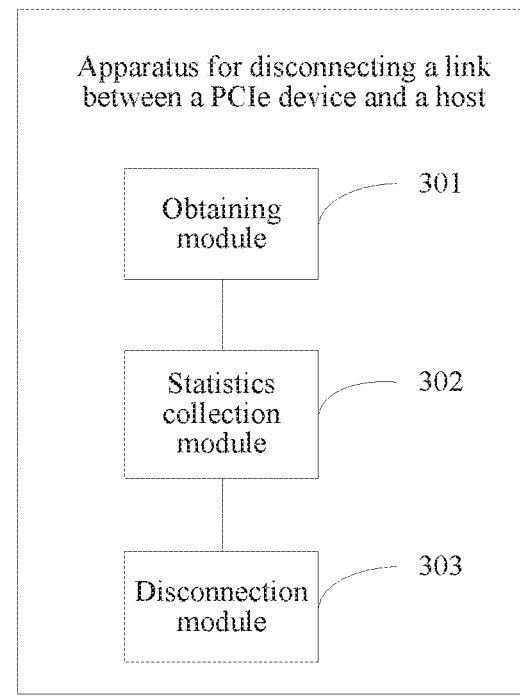
Figures 2, 3:
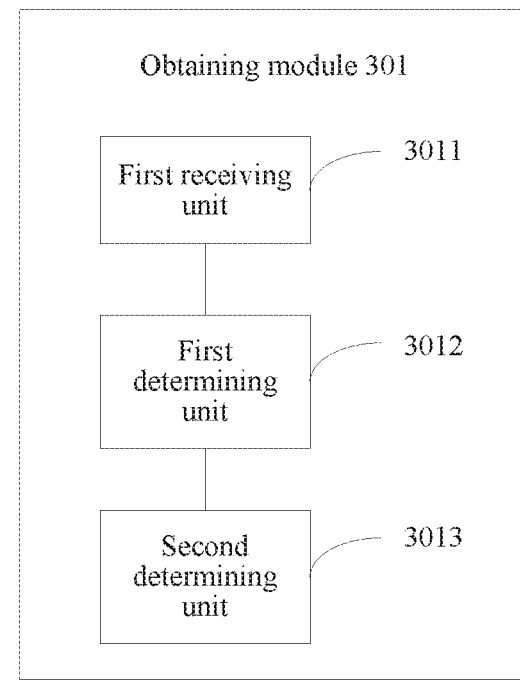
Figure 3:
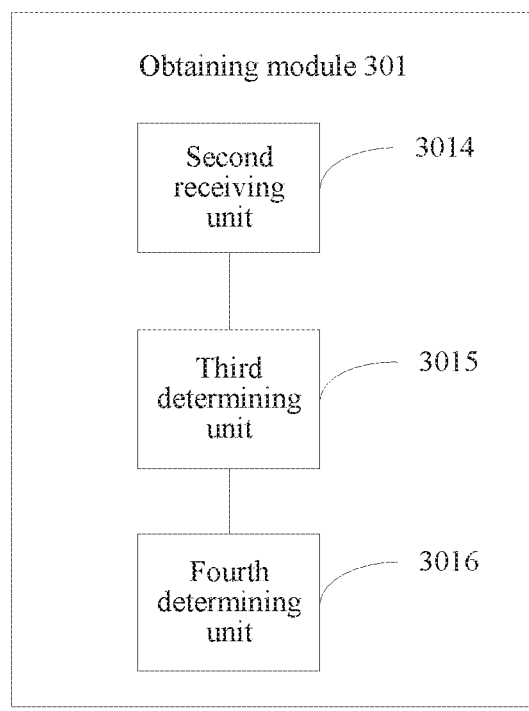
Figures 3, 4:
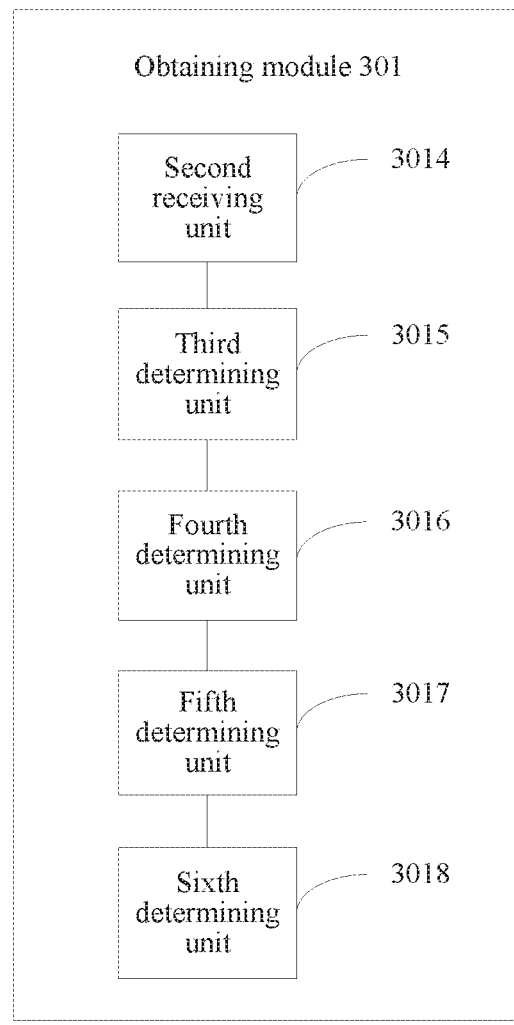
Figures 3, 4, 5:
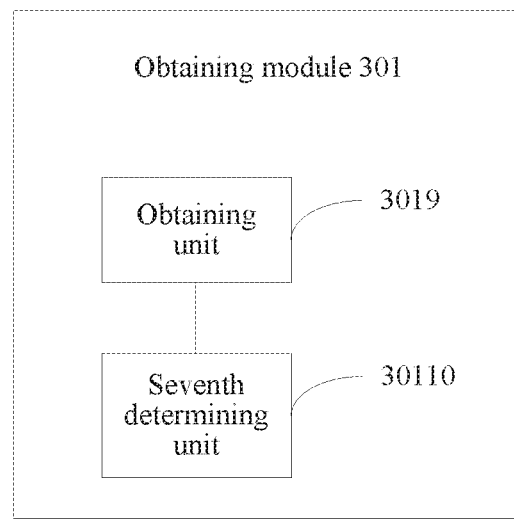
Figures 3, 4, 5, 6:
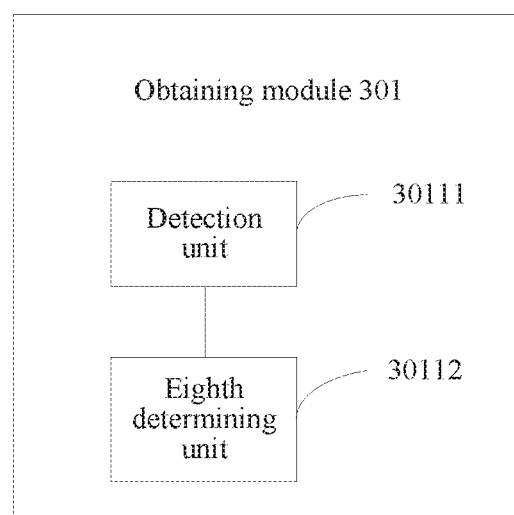
Figure 4:
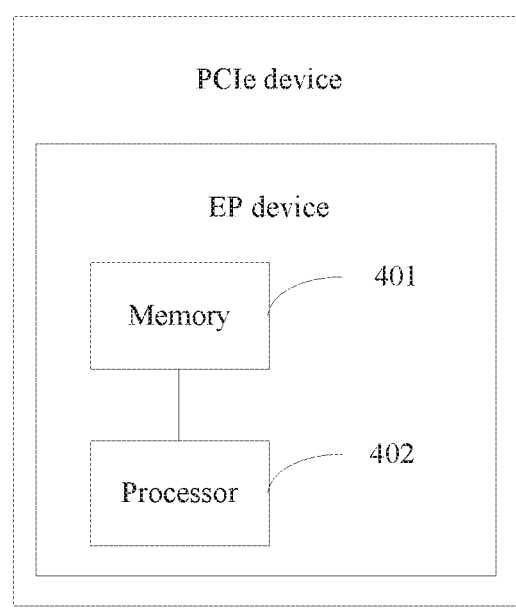

Further, referring to FIG. 3-5, the obtaining module 301 includes:

an obtaining unit 3019, configured to obtain a first credit value required by a TLP to be sent by the host and a current remaining second credit value of the EP device; and a seventh determining unit 30110, configured to: if the first credit value is greater than the second credit value, determine that the error type of the error in transmitting the TLP between the PCIe device and the host is a credit value insufficiency error type.

Further, the obtaining unit 3019 is configured to: obtain a packet header type, a packet data type, and a packet data length of the TLP to be sent by the host; and determine, according to the packet header type, the packet data type, and the packet data length, the first credit value required by the TLP.

Further, referring to FIG. 3-6, the obtaining module 301 includes:

a detection unit 30111, configured to detect whether the PCIe device encounters an exception; and an eighth determining unit 30112, configured to: if the detection unit detects that the PCIe device encounters an exception, determine that the error type of the error in transmitting the TLP between the PCIe device and the host is a PCIe device exception error type.

Further, the disconnection module 303 is configured to set a system clock of the PCIe device to be in an unavailable state using a gated clock. The unavailable state is used to instruct the PCIe device to refuse to process a processing request sent by the host.

Further, the disconnection module 303 is configured to disconnect the link between the PCIe device and the host if the error type is an uncorrectable error type specified in the PCIe protocol.

In this embodiment of the present disclosure, the EP device obtains the error type of the error in transmitting the TLP between the PCIe device and the host; if the error type is the correctable error type specified in the PCIe protocol, the EP device collects the statistics on the duration for which the error type exists; and if the duration reaches the preset duration, the EP device disconnects the link between the PCIe device and the host. In this way, the EP device detects the error type of the error in transmitting the TLP, determines whether the link between the PCIe device and the host encounters an exception, and disconnects the link when detecting that the link encounters an exception. Therefore, impact on a host service can be reduced without a need to disconnect links between the host and all PCIe devices.

An embodiment of the present disclosure provides a Peripheral Component Interconnect Express PCIe device, configured to perform the method for disconnecting a link between a PCIe device and a host. Referring to FIG. 4, the PCIe device includes an endpoint EP device, and the EP device includes a memory 401 and a processor 402. The memory 401 is configured to store data obtained by the processor 402.

The processor 402 is configured to obtain an error type of an error in transmitting a TLP between the PCIe device and the host.

The processor 402 is further configured to: if the error type is a correctable error type specified in the PCIe protocol, collect statistics on duration for which the error type exists.

The processor 402 is further configured to disconnect a link between the PCIe device and the host if the duration reaches preset duration.

Further, the processor 402 is configured to: receive a TLP sent by the host, and determine whether the TLP is corrupted.

The processor 402 is further configured to: if the TLP is corrupted, determine that the error type of the error in transmitting the TLP between the PCIe device and the host is a negative acknowledgement NAK error type.

Further, the processor 402 is configured to: receive a TLP sent by the host, and determine whether the TLP is a preset TLP.

The processor 402 is further configured to: if the TLP is not the preset TLP, determine that the error type of the error in transmitting the TLP between the PCIe device and the host is a transmission error type.

Further, the processor 402 is configured to: obtain a first sequence number of the TLP, and predict a third sequence number of the TLP according to a second sequence number of a previous TLP whose receiving time is closest to a current time; and if the first sequence number is not equal to the third sequence number, determine that the TLP is not the preset TLP Further, the transmission error type includes a retransmission error type and a missed-transmission error type.

The processor 402 is further configured to: if the TLP is later than the preset TLP, determine that the error type of the error in transmitting the TLP between the PCIe device and the host is the missed-transmission error type.

The processor 402 is further configured to: if the TLP is earlier than the preset TLP, determine that the error type of the error in transmitting the TLP between the PCIe device and the host is the retransmission error type.

Further, the processor 402 is configured to obtain a first credit value required by a TLP to be sent by the host and a current remaining second credit value of the EP device.

The processor 402 is further configured to: if the first credit value is greater than the second credit value, determine that the error type of the error in transmitting the TLP between the PCIe device and the host is a credit value insufficiency error type.

Further, the processor 402 is configured to: obtain a packet header type, a packet data type, and a packet data length of the TLP to be sent by the host; and determine, according to the packet header type, the packet data type, and the packet data length, the first credit value required by the TLP Further, the processor 402 is configured to detect whether the PCIe device encounters an exception.

The processor 402 is further configured to: if the processor detects that the PCIe device encounters an exception, determine that the error type of the error in transmitting the TLP between the PCIe device and the host is a PCIe device exception error type.

Further, the processor 402 is configured to set a system clock of the PCIe device to be in an unavailable state using a gated clock, where the unavailable state is used to instruct the PCIe device to refuse to process a processing request sent by the host.

The processor 402 is further configured to disconnect the link between the PCIe device and the host if the error type is an uncorrectable error type specified in the PCIe protocol.

In this embodiment of the present disclosure, the EP device obtains the error type of the error in transmitting the TLP between the PCIe device and the host; if the error type is the correctable error type specified in the PCIe protocol, the EP device collects the statistics on the duration for which the error type exists; and if the duration reaches the preset duration, the EP device disconnects the link between the PCIe device and the host. In this way, the EP device detects the error type of the error in transmitting the TLP, determines whether the link between the PCIe device and the host encounters an exception, and disconnects the link when detecting that the link encounters an exception. Therefore, impact on a host service can be reduced without a need to disconnect links between the host and all PCIe devices.

It should be noted that when the apparatus for disconnecting a link between a PCIe device and a host provided in the foregoing embodiment disconnects a link between the PCIe device and the host, division of the foregoing function modules is merely used as an example for description. In actual application, the foregoing functions may be allocated to different function modules for implementation according to a requirement, that is, an inner structure of the apparatus is divided into different function modules to implement all or some of the functions described above. In addition, the apparatus for disconnecting a link between a PCIe device and a host provided in the foregoing embodiment pertains to a same concept as the method embodiment for disconnecting a link between a PCIe device and a host. For a detailed implementation process, refer to the method embodiment. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of the embodiments of the present disclosure, but are not intended to limit the present disclosure. Any modification, equivalent replacement, improvement, and the like made without departing from the spirit and principle of the present disclosure shall fall within the protection scope of the present disclosure.

What is claimed is:

1. A system, wherein, the system comprises:
   a host; and
   a Peripheral Component Interconnect Express (PCIe) device, wherein the PCIe device comprises an endpoint (EP) device, the EP device comprising:
      at least one processor; and
      at least one non-transitory computer-readable storage medium coupled to the at least one processor and storing programming instructions for execution by the at least one processor, the programming instructions instruct the at least one processor to:
obtain an error type of an error in transmitting a transaction layer packet (TLP) between the PCIe device and the host by operations comprising:
obtaining a first credit value required by a transaction layer packet (TLP) to be sent by the host and a current remaining second credit value of the EP device; and
in response to determining that the first credit value is greater than the second credit value, determining that an error type of an error in transmitting the TLP between the PCIe device and the host is a credit value insufficiency error type;
in response to determining that the error type is a correctable error type specified in a PCIe protocol, collect statistics of a duration for which the error type exists; and
disconnect a link between the PCIe device and the host in response to determining that the statistics of the duration equals or exceeds a preset duration.

2. The system according to claim 1, wherein the programming instructions instruct the at least one processor to:
receive a TLP sent by the host;
determine whether the TLP is corrupted; and
in response to determining that the TLP is corrupted, determine that the error type of the error in transmitting the TLP between the PCIe device and the host is a negative acknowledgement (NAK) error type.

3. The system according to claim 1, wherein the programming instructions instruct the at least one processor to:
receive a TLP sent by the host;
determine whether the TLP is a preset TLP; and
in response to determining that the TLP is not the preset TLP, determine that the error type of the error in transmitting the TLP between the PCIe device and the host is a transmission error type.

4. The system according to claim 3, wherein the programming instructions instruct the at least one processor to:
obtain a first sequence number of the TLP;
predict a third sequence number of the TLP according to a second sequence number of a previous TLP, wherein the previous TLP is received most recently relative to a current time; and
in response to determining that the first sequence number is not equal to the third sequence number, determine that the TLP is not the preset TLP.

5. The system according to claim 3, wherein the transmission error type comprises a retransmission error type and a missed-transmission error type; and the programming instructions instruct the at least one processor to:
determine that the error type of the error in transmitting the TLP between the PCIe device and the host is the missed-transmission error type in response to determining that the TLP is later than the preset TLP; or
determine that the error type of the error in transmitting the TLP between the PCIe device and the host is the retransmission error type in response to determining that the TLP is earlier than the preset TLP.

6. The system according to claim 1, wherein the programming instructions instruct the at least one processor to:
obtain a packet header type, a packet data type, and a packet data length of the TLP to be sent by the host; and
determine, according to the packet header type, the packet data type, and the packet data length, the first credit value required by the TLP.

7. The system according to claim 1, wherein the programming instructions instruct the at least one processor to:
detect whether the PCIe device encounters an exception; and
in response to determining that the at least one processor detects that the PCIe device encounters an exception, determine that the error type of the error in transmitting the TLP between the PCIe device and the host is a PCIe device exception error type.

8. The system according to claim 1, wherein the programming instructions instruct the at least one processor to:
set a system clock of the PCIe device to be in an unavailable state using a gated clock, wherein, in the unavailable state, the PCIe device refrains from processing a processing request sent by the host.

9. The system according to claim 1, wherein the programming instructions instruct the at least one processor to:
disconnect the link between the PCIe device and the host in response to determining that the error type is an uncorrectable error type specified in the PCIe protocol.

10. The system according to claim 1, wherein the system further comprises a PCIe switch; and
the PCIe switch is connected to the host and is connected to the PCIe device.

11. The system according to claim 10, wherein the PCIe switch is connected to a central processing unit (CPU) of the host and is connected to the PCIe device.

12. The system according to claim 11, wherein the PCIe switch is connected to a CPU of the host using a upstream port and is connected to the PCIe device using a downstream port.

13. A method for disconnecting a link between a Peripheral Component Interconnect Express (PCIe) device and a host, wherein the PCIe device comprises an endpoint (EP) device, the method comprising:
obtaining an error type of an error in transmitting a TLP between the PCIe device and the host by operations comprising:
obtaining a first credit value required by a transaction layer packet (TLP) to be sent by the host and a current remaining second credit value of the EP device; and
determining that an error type of an error in transmitting the TLP between the PCIe device and the host is a credit value insufficiency error type in response to determining that the first credit value is greater than the second credit value;
in response to determining that the error type is a correctable error type specified in a PCIe protocol, collecting statistics of a duration for which the error type exists; and
disconnecting a link between the PCIe device and the host in response to determining that the statistics of the duration equals or exceeds a preset duration.

14. The method according to claim 13, wherein the obtaining a first credit value required by a TLP to be sent by the host comprises:
obtaining a packet header type, a packet data type, and a packet data length of the TLP to be sent by the host; and
determining, by the EP device according to the packet header type, the packet data type, and the packet data length, the first credit value required by the TLP.

15. The method according to claim 13, wherein the disconnecting a link between the PCIe device and the host comprises:
setting a system clock of the PCIe device to be in an unavailable state using a gated clock, wherein, in the unavailable state, the PCIe device refrains from processing a processing request sent by the host.

16. A Peripheral Component Interconnect Express (PCIe) device, wherein the PCIe device comprises an endpoint (EP) device comprising:
  at least one processor; and
  at least one non-transitory computer-readable storage medium coupled to the at least one processor and storing programming instructions for execution by the at least one processor, the programming instructions instruct the at least one processor to:
    obtain an error type of an error in transmitting a TLP between the PCIe device and a host by operations comprising:
      obtaining a first credit value required by a transaction layer packet (TLP) to be sent by the host and a current remaining second credit value of the EP device; and
      determining that an error type of an error in transmitting the TLP between the PCIe device and the host is a credit value insufficiency error type in response to determining that the first credit value is greater than the second credit value;
    in response to determining that the error type is a correctable error type specified in a PCIe protocol, collect statistics of a duration for which the error type exists; and
    disconnect a link between the PCIe device and the host in response to determining that the statistics of the duration equals or exceeds a preset duration.

17. The PCIe device according to claim 16, wherein the programming instructions instruct the at least one processor to:
  receive a TLP sent by the host;
  determine whether the TLP is corrupted; and
  in response to determining that the TLP is corrupted, determine that the error type of the error in transmitting the TLP between the PCIe device and the host is a negative acknowledgement (NAK) error type.

18. The PCIe device according to claim 16, wherein the programming instructions instruct the at least one processor to:
  receive a TLP sent by the host;
  determine whether the TLP is a preset TLP; and
  in response to determining that the TLP is not the preset TLP, determine that the error type of the error in transmitting the TLP between the PCIe device and the host is a transmission error type.

19. The PCIe device according to claim 16, wherein the programming instructions instruct the at least one processor to:
  detect whether the PCIe device encounters an exception; and
  in response to determining that the at least one processor detects that the PCIe device encounters an exception, determine that the error type of the error in transmitting the TLP between the PCIe device and the host is a PCIe device exception error type.

20. The PCIe device according to claim 16, wherein the programming instructions instruct the at least one processor to:
  disconnect the link between the PCIe device and the host in response to determining that the error type is an uncorrectable error type specified in the PCIe protocol.

* * * * *